(12) United States Patent
Egozi et al.

(10) Patent No.: US 6,298,158 B1
(45) Date of Patent: Oct. 2, 2001

(54) RECOGNITION AND TRANSLATION SYSTEM AND METHOD

(75) Inventors: Ofer Egozi; Ovadia Amnon, both of Haifa (IL)

(73) Assignee: Babylon, Ltd., Or-Yehuda (IL)

( * ) Notice: Subject to any disclaimer, the term of this patent is extended or adjusted under 35 U.S.C. 154(b) by 0 days.

(21) Appl. No.: 08/936,960

(22) Filed: Sep. 25, 1997

(51) Int. Cl.[7] .............................. G06K 9/72; G06K 17/28
(52) U.S. Cl. ............................ 382/229; 382/190; 702/2; 702/10
(58) Field of Search ................................. 382/229, 231, 382/165, 164, 199, 190, 163, 181, 203, 321; 704/1, 2, 3, 4, 5, 6, 7, 8, 9, 10

(56) References Cited

U.S. PATENT DOCUMENTS

| | | | |
|---|---|---|---|
| 4,791,587 | * 12/1988 | Doi ........................................... | 704/2 |
| 5,075,896 | * 12/1991 | Wilcox et al. ........................ | 382/225 |
| 5,265,171 | * 11/1993 | Sangu ................................... | 382/177 |
| 5,583,761 | * 12/1996 | Chou .................................... | 395/798 |
| 5,680,511 | * 10/1997 | Baker et al. ......................... | 704/257 |
| 5,826,220 | * 10/1998 | Takeda et al. ........................... | 704/7 |
| 5,845,143 | * 12/1998 | Yamauchi et al. ................... | 395/752 |

* cited by examiner

Primary Examiner—Bhavesh Mehta
(74) Attorney, Agent, or Firm—Goodwin Procter LLP

(57) ABSTRACT

The invention comprises a method and system of recognition and translation, stored on a digital storage device with an operating system and running computer applications, such as a personal computer, which recognizes input by the human computer user and transmits output to the human user, which performs non-optical and optical character recognition of characters displayed on the output device of the digital storage device, which automatically recognizes and translates phrases contiguous to and including the phrase upon which the System is activated and which translates words from one written phrase set to a second written phrase set.

18 Claims, 6 Drawing Sheets

US 6,298,158 B1

RECOGNITION AND TRANSLATION SYSTEM AND METHOD

FIELD OF THE INVENTION

The present invention is directed generally to an invention with on-screen optical character recognition capability and with translation and automatic recognition and translation of phrases and is directed more particularly to a recognition and translation system having a digital storage device with input and output capabilities, such as a personal computer with computer software running over an operating system.

BACKGROUND OF THE INVENTION

At present, optical character recognition systems and translation systems are available. The available optical character recognition systems typically require high resolution printed words. Such optical character recognition systems, thus, can only recognize text printed on paper or other document form and cannot optically recognize characters on-screen which is displayed in a lower resolution. Further, available optical character recognition systems typically recognize text by recognition of the character. Such optical character recognition systems, thus, are dependent upon a specific recognition of the shape of a character. These optical character recognition systems, thus, are limited to paper and to recognition of a character based upon its foreground characteristics.

Available translation systems typically are limited to performing translation of words to another language without taking into consideration the use of the word in a phrase or a sentence. These available translation systems, thus, fail to take into consideration the use of a word in a phrase or a sentence to provide the most accurate translation or translations of the word into another language.

Translation systems include the Roboword product created by TechnoCraft and a product created by Accent. However, these products do not have the capability of translating words depending upon their use in a phrase or sentence. Furthermore, these systems do not have optical character recognition technology that allows on-screen text recognition or optical character recognition capability which utilizes characteristics such as the background of a screen to recognize a character. Accordingly, in instances where, for example, an accurate translation of a word is dependent upon its use in a phrase, these systems will not accurately provide a translation of the word. Furthermore, these systems are not capable of optically recognizing on-screen text or optically recognizing text by use of characteristics such as the background of a letter.

Optical character recognition technology is available, but this existing technology is dependent upon recognition of the foreground of the character. Accordingly, if a character is printed such that the foreground of the character is not understood by the technology, the technology will not be capable of reading it. Furthermore, the existing technology cannot optically recognize characters using characteristics such as the background of a letter in determining the correct printed letter. In addition, existing technology cannot typically optically recognize characters displayed on a screen because of the lower resolution of on-screen displays.

Additionally, upon unsuccessful recognition and translation of a word or phrase, recognition and translation systems do not typically provide a list of words or phrases which are linguistically similar to the displayed word or phrase and do not allow the System user to add the displayed word or phrase and the corresponding translation to a user dictionary for future translations.

Furthermore, recognition systems and translation systems do not typically incorporate the ability to optically recognize characters in combination with the ability to translate words and phrases.

Accordingly, an object of the invention is a recognition and translation system with the ability to optically recognize characters displayed on a digital screen, such as a computer monitor.

A further object of the invention is a recognition and translation system which is capable of using characteristics such as the background of the screen to optically recognize characters.

Another object of the invention is a recognition and translation system which is capable of optically recognizing characters produced by many different applications displayed on-screen.

Still another object of the invention is to provide a recognition and translation system which is capable of accurately translating words from one spoken language to another depending on the use of the word in a phrase or sentence.

Another object of the invention is a recognition and translation system which is capable of automatically recognizing and translating phrases in text.

Furthermore, an object of the invention is a recognition and translation system which combines the ability to optically recognize characters displayed on screen and the ability to translate words from one spoken language to another depending on the use of the word in a phrase or sentence.

A further object of the invention is a recognition system which can be utilized by many different modes of digital display.

An addition object of the invention is a recognition and translation system which provides a list of words or phrases which are linguistically similar to the displayed word or phrase upon unsuccessful recognition and translation of a word or phrase.

Another object of the invention is a recognition and translation system which allows the System user to add the displayed word or phrase and the corresponding translation to a user dictionary for future translations.

SUMMARY OF THE INVENTION

These and other objects of the invention, which shall become apparent hereafter, are achieved by providing a recognition and translation system, including a personal computer having a computer monitor and keyboard, a means for connecting a mouse or other point-and-click interface mechanism to the computer system, optical and non-optical character recognition, and translation of words from one spoken language to another in the context in which the words are used in the phrase or sentence.

In an embodiment, the invention is stored on or accessible by a computer or other digital storage device which utilizes a digital display device and any operating system, uses three different optical and non-optical methodologies to recognize characters, automatically recognizes and translates phrases, translates words from one spoken language to another by a method which translates the word incorporating its use in the phrase or sentence, provides a list of linguistically similar words or phrases upon unsuccessful recognition and translation, allows the system user to add the word or phrase and its corresponding translation to a dictionary for future reference upon unsuccessful recognition and translation, and has a keystroke or other interactive activation mechanism.

In a preferred embodiment, the invention is stored on or accessible by a personal computer or other digital display device running an operating system with a graphical user interface, such as Windows 95 or NT operating system and connected to the Internet, connected to a mouse with a right and left button, providing optical character recognition capability through font-specific and non-font specific analysis of the background behind each letter or letters, non-optical character recognition capability, the ability to automatically recognize and translate words, the ability to translate words from one spoken language to another as the words are used in phrases and sentences, the ability to provide a list of linguistically similar words or phrases upon unsuccessful recognition and translation, and the ability to allow the system user to add the word or phrase and its corresponding translation to a dictionary for future reference upon unsuccessful recognition and translation.

BRIEF DESCRIPTION OF THE DRAWINGS

The invention would be better understood from the following Detailed Description of the Preferred Embodiment, with reference to the accompanying drawings, in which.

DETAILED DESCRIPTION OF THE PREFERRED EMBODIMENTS

Figure 1:
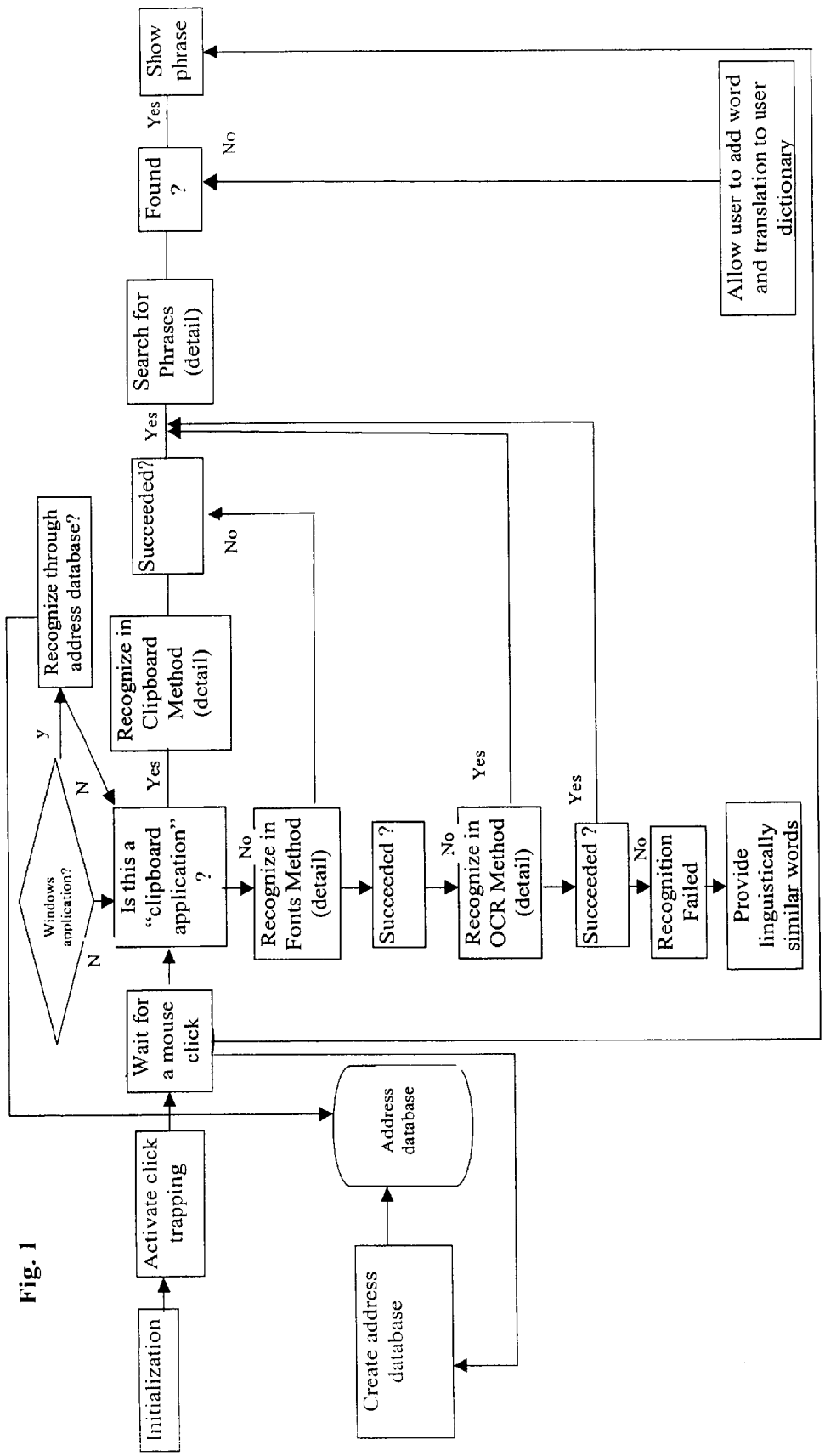
FIG. 1 is a flowchart depicting the operation of the translation system with multiple methods for character recognition and a translation method.

Referring to the drawings, wherein like numerals reflect like elements throughout the several views, FIG. 1 is a flowchart showing the process embodied by the Recognition and Translation System. The System is initialized 101 and prepares to recognize the method of activation, such as activation by clicking the right button of a mouse 102 or other specific keystroke or human-directed action on any letter in a word and runs in the background of the computer. A computer user then commences an activity, such as connecting to the Internet or commencing creation of a document using a variety of types of document creation software. Once the System is running in the background and the document creation or other application is commenced, the System waits for the computer user to activate it by the activation mechanism, such as the clicking of the right button of a mouse 103. If the System is running on a Windows application 103A, upon input by the computer user, the System captures characteristics of the words and phrases as stored by the application 150, determines the address at which the words and phrases will be displayed by Windows 150, creates a address database 170 containing the contents of the words and phrases, the corresponding location (address) in the application, and the corresponding final Windows location at which each word or phrase will be displayed 150. Once the computer user activates the System, it first determines whether this is a Windows application 103A and if it can recognize the character through using the address database 170. If the System cannot recognize the characters through use of the address database, it determines whether the application is a clipboard application 104, that is, those applications for which the System has drivers allowing immediate recognition of the characters by the System and for which the System does not require use of its optical character recognition capability. If the System fails to recognize the application, it determines the font of the text 105 displayed by the application, which utilizes the optical character recognition technology 107. If the System fails to recognize the font used by the application, it then determines the character solely using optical character recognition technology 107. If the System is successful in any of these methods of recognizing the character, it commences translation of the word, and automatic recognition and translation of the word's surrounding phrases, from which the system was activated 112, 113, 114, FIG. 5. If the System is unsuccessful in all three methods of recognizing the characters, it provides the capabilities depicted in FIG. 6, 115, 116.

Figure 2:
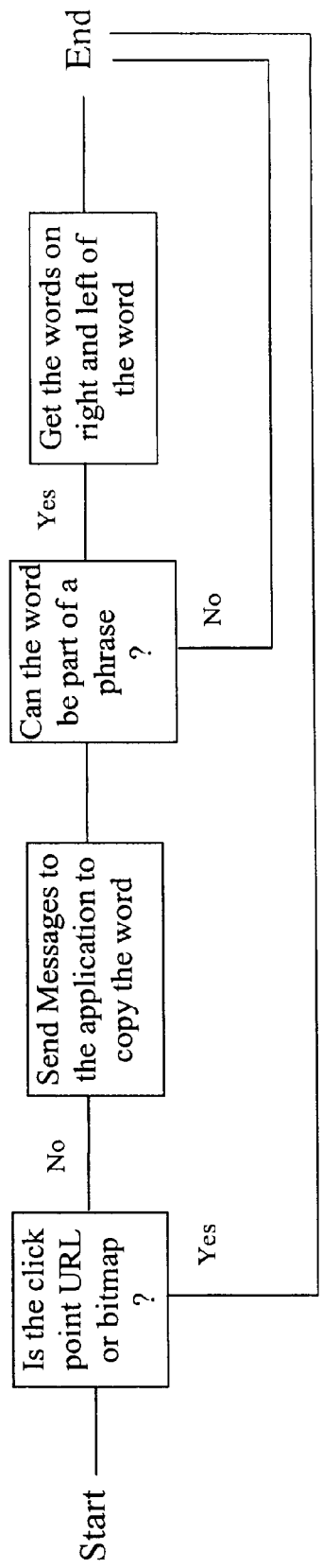
FIG. 2 is a flowchart depicting a clipboard recognition method of character recognition.

In FIG. 2, the flowchart depicts the process by which the System determines whether the text is displayed by a clipboard application automatically recognized by the System 104. Referring specifically to FIG. 2, the System determines whether the word from which the application was activated is displayed in a bitmap format 201 by performing a select and mark copy mechanism. If it is a bitmap display, the System must use alternate methods of recognition 201A, such as the font method (FIG. 3) or the optical character recognition method (FIG. 4). If it is not a bitmap display, the System sends the application a message to copy the word and sends a unique application identifier to the application, signaling to the application that it must use application-specific methods of copying 201. After the System copies the word, it determines whether the word can be part of a phrase 202, 500 and then reads and copies the words to the left and right 203, 501.

Figure 3:
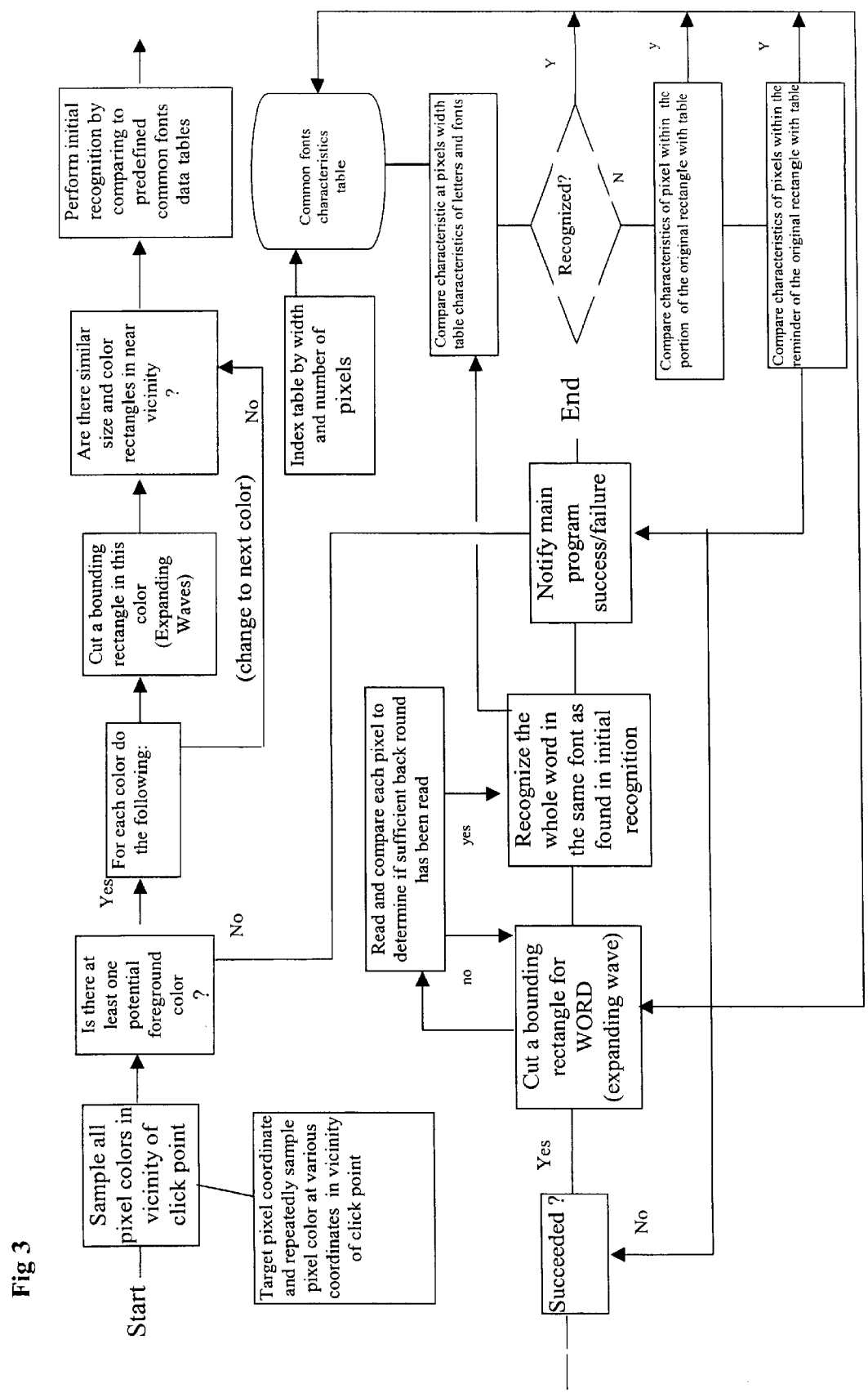
FIG. 3 is a flowchart depicting a font recognition method of character recognition.
Figure 4:
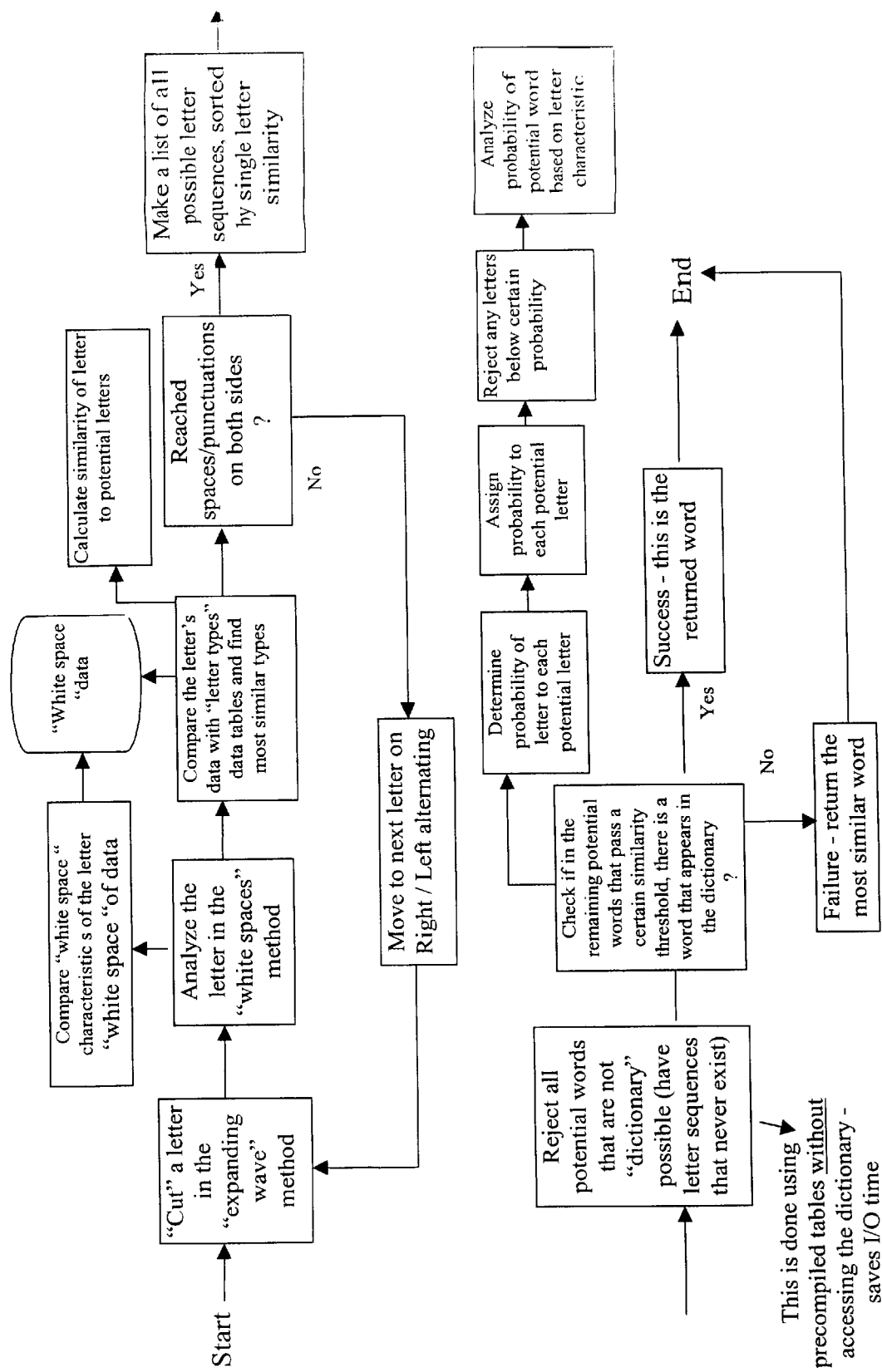
FIG. 4 is a flowchart depicting an optical recognition method of character recognition.

In FIG. 3, the flowchart depicts the process by which the System determines the font used by the application to display the word, using in part the optical character recognition technology. The System first samples all pixel colors in the vicinity of the click point 300 by repeatedly targeting a coordinate on the screen and reading and determining the pixel color at the location of the coordinate 300A. By repeatedly sampling the pixel colors in the pre-determined area of analysis, the System determines whether any pixel is of the same color as its neighboring pixel in order to determine whether the application utilizes at least one potential foreground color 301. If the System determines that the application displays at least one potential foreground color, then for each foreground color, the system iteratively creates and examines an expanding rectangle of the display 303 to determine the background, as distinguished from the foreground of the display by reading and comparing each pixel and its respective color 304. Once the background of the display has been processed sufficiently to determine the character displayed, the System processes the potential character by first comparing the font of the character with fonts already understood by the System 305, such as Netscape and Internet Explorer fonts, and the Windows standard fonts. The System performs this processing 305 by comparing the pixels in the potential letter with data compiled by the System for various fonts through use of binary characteristics 305A. The data compiled by the System for various fonts 350 are comprised of various characteristics, which are accessible by an index based upon the width of the letter and the number of pixels in the letter which are not active 305B. In the event that the pixel comparison method 305, 305A, 305B is not successful, the System performs the comparison of the displayed letter to the data table with only a small portion of the original "read" rectangle and performs the comparison in an increasingly larger portion of the rectangle until the character is successfully read 305C and, if successful, the System than performs the same comparison with the remainder of the "read" rectangle 305D. If the System recognizes the font in these methods, it determines the word displayed by iteratively examining an expanding rectangle of the display 307 by reading and comparing each pixel and its respective color to the stored characteristics of the background of the letter and determining when the word has been "read" 307A by when sufficient background has been displayed. Once the System has "read" the letter, it processes each potential character in the word by first comparing the font of the character with fonts already understood by the system 308, 305, such as Netscape and Internet Explorer fonts, and the Windows standard fonts. The System performs this processing 308, 305 by comparing the pixels in each potential letter of the word with data compiled by the System for various fonts through use of binary characteristics 305A. The data compiled by the System for various fonts are comprised of various characteristics, which are accessible by an index based upon the width of the letter and the number of pixels in the letter which are not active 305B. In the event that the pixel comparison method 308, 305A, 305B is not successful, the System performs the comparison of the displayed letter to the data table with only a small portion of the original "read" rectangle and performs the comparison in an increasingly larger portion of the rectangle until each character of the word is successfully read 305C and, if successful, the System than performs the same comparison with the remainder of the "read" rectangle 305D.

In FIG. 4, the flowchart depicts the process by which the System utilizes optical character recognition technology to recognize the text displayed by the application. The System iteratively creates and examines an expanding rectangle of the background of the display to read characteristics of a letter (the foreground) in the word displayed 400. The System determines the characteristics of a letter by first analyzing the background, as distinguished from the foreground, of the displayed letter in the word 401, pixel by pixel. The System compares the "white space" characteristics of the letter with known characteristics of a letter, using information compiled on each letter, its defined areas of "white space", and the position of the "white space" in the letter 401A, 401B. Once it has retrieved sufficient data about the letter of the displayed word, the system processes the potential letter by first comparing the characteristics of the "white space" of the displayed potential letter with characteristics of "white space" of other letters already understood by the system, such as Netscape and Internet Explorer fonts, and the Windows standard fonts 402. The data compiled by the System for various "white space" are comprised of various characteristics of "white space" in various letters, which is indexed by as unique an index as possible to facilitate the comparison 401B. The System calculates the similarity of each "read" letter to the potential letters 402A.

For each letter in the word, the system repeats 403 the foregoing process 402 by examining and analyzing the next letter to the right and to the left of the displayed letter 405 until the entire word has been read, by iteratively repeating the process until the System reads a "period", "comma", or punctuation 403. Once the entire word has been optically recognized in this manner by the System, it determines all permutations of potential words 404 based upon characteristics of the "read" word. The System rejects any potential letter combinations which cannot logically exist based upon a table which is created by the system 406. Once any illogical letter combinations are eliminated, the System analyzes all remaining potential words 407 by, for each letter, determining the probability of the "read" letter to each potential letter 407A, assigning a probability to each potential letter 407B, and rejecting any potential letters below a certain probability 407C. Once all probable letters are tabulated, potential words based upon probable letters are determined and the System analyzes the probability, based upon letter characteristics, of each potential word 407D. The word with the highest probability is returned to the computer user either as an exact match (100% probability) 409 or a most similar match (less than 100% similarity) 408.

Figure 5:
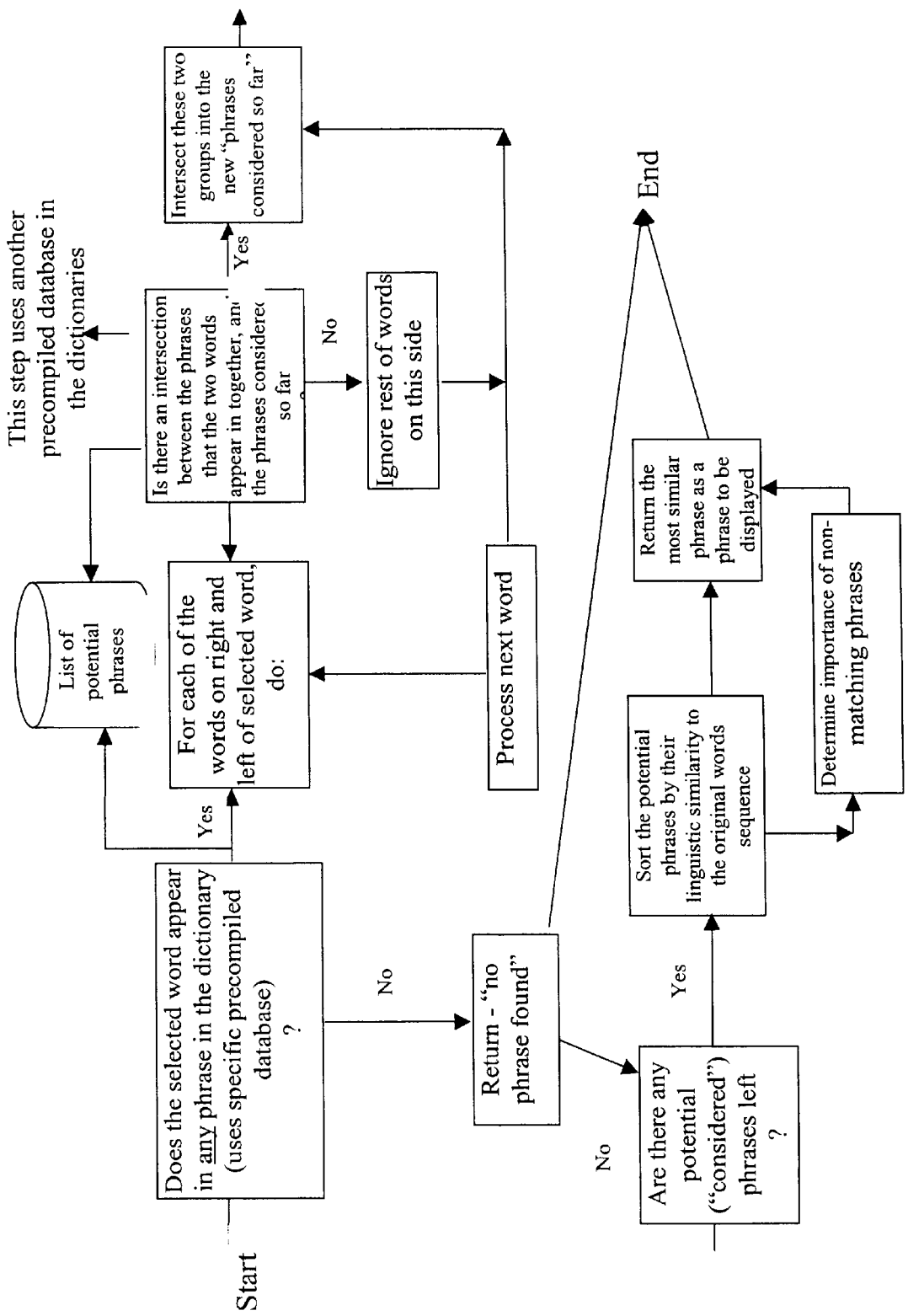
FIG. 5 is a flowchart depicting a translation method.

In FIG. 5, the flowchart depicts the translation process by which the System determines the most accurate translation of the displayed and recognized word based upon the use of the word in a phrase or sentence, The System determines whether the displayed and selected word is appears in any word or phrase understood by the System 500, 202 and determines a list of potential phrases 503, 500A. If the displayed word is recognized, the System iteratively examines each word to the right and to the left of the word 501, 203 in combination with the word already "read" by the System. For each new and expanding combination of words (except for the first combination of words), the System searches and determines whether the current combination of words are contained in any phrases in the list maintained by the System 500A. If found, the phrase is maintained in the list 500A; if not found, the phrase is deleted from the list 500A. The System repeats the process 502 until (1) a certain predetermined stop point is reached; or (2) the combination does not match any phrase contained in the list 500A maintained by the system 504 for either the right or left side 504, upon which the system stops iteratively examining the combination of words for the unsuccessful side 504, but continues to search on the successful side 502. When no combination of words matches any phrase contained in the list 500A maintained by the System for words either on the left or right of the displayed word, the System determines whether any potential phrases remain in the list 500A, 507. The System then determines which potential phrases 500A are most likely to most accurately translate the displayed word on a word by word basis 508. The System determines the probability of an accurate translation 508 by determining the importance of the words which do not match and assessing a penalty against the potential phrase dependent upon the importance of the non-matching word 508A. The system then returns the translations most likely to accurately translate the displayed word 509.

Figure 6:
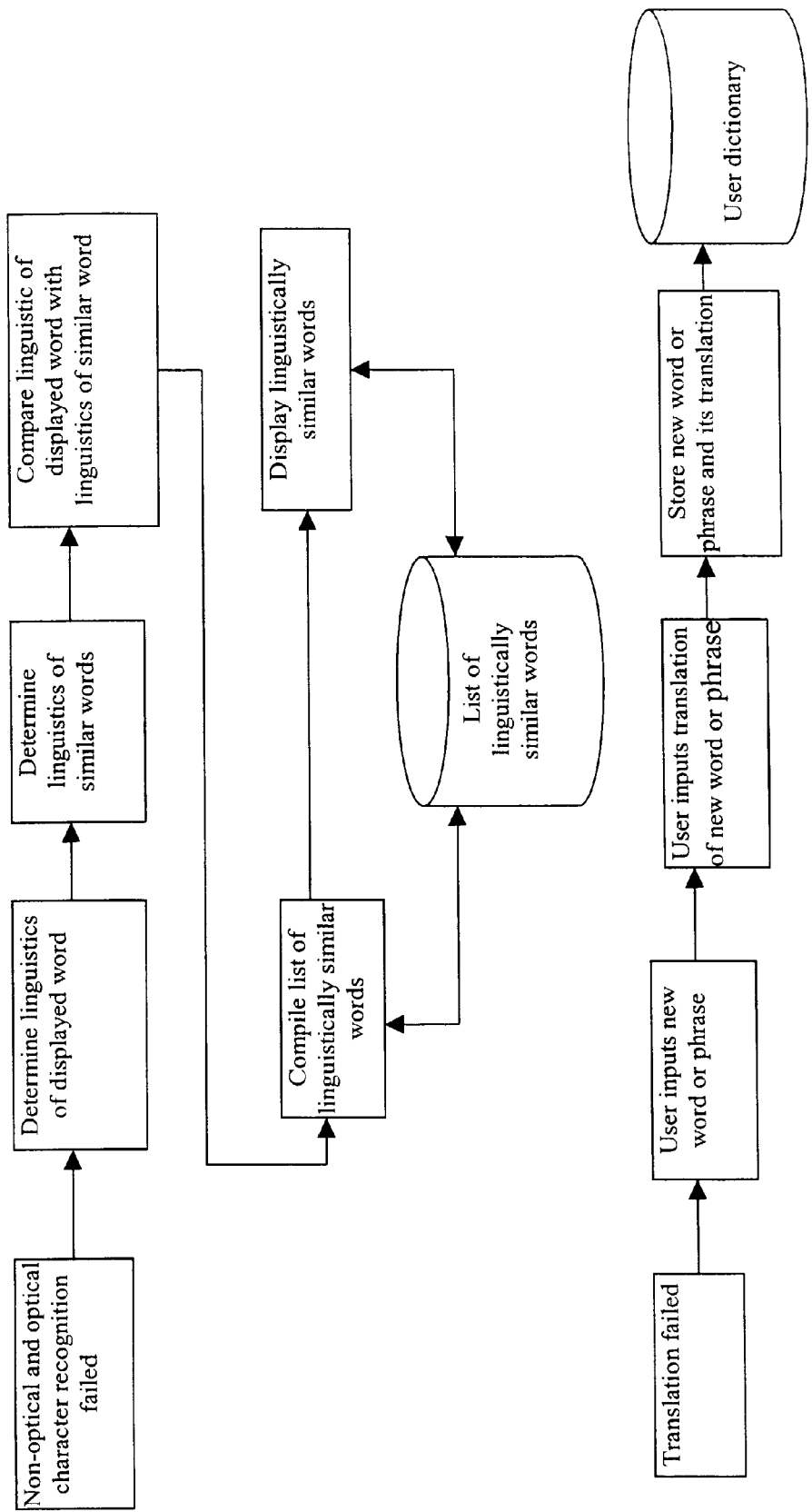
FIG. 6 is a flowchart depicting a method of providing linguistically similar words and phrases and of allowing the user to add the word and translation to a dictionary upon unsuccessful recognition and translation.

In FIG. 6, the flowchart depicts the capabilities of the System upon unsuccessful recognition and translation of the word or phrase. If the System is unsuccessful at optically and non-optically recognizing the displayed word or phrase 600, 115, it determines the linguistics of the displayed word or phrase 601, determines the linguistics of similar words 602, compares the linguistics of the displayed word or phrase with the linguistics of similar words or phrases 603, compiles a list of linguistically similar words and phrases 604, 605 and displays the list of linguistically similar words to the System user 606. If the System is unsuccessful at translating the word or phrase 600A, 116, it allows the user to add the word or phrase 620 and its translation 621 to a dictionary to be accessed in the future 622, 623.

While the preferred and alternate embodiments of the system have been depicted in detail, modifications and adaptations may be adapted thereto, without departing from the spirit and scope of the system as delineated in the following claims:

What is claimed is:

1. A method of recognition and translation, stored on a digital storage device with an operating system and running computer applications, said digital storage device capable of recognizing output to the user and input by the user and translating at least one word from one written phrase set to a second written phrase set, said method comprising the steps of:

inputting information to the digital storage device, said device having output understandable to a human user;

activating the method of recognition and translation;

delineating an activated area;

connecting between the digital storage device and the activation means, non-optically recognizing character types output by the digital storage device, wherein the step of non-optical character recognition comprises recognizing clipboard applications;

translating the at least one word from the one written phrase set to the second written phrase set;

automatically recognizing a combination of words;

translating a combination of words from the one written phrase set to the second written phrase set;

determining and providing words or phrases which are linguistically similar to the displayed word or combination of words if the word or combination of words is not recognized; and creating and augmenting a user dictionary which stores the displayed word or combination of words and its translation if the word or combination of words cannot be translated.

2. The method of recognition and translation of claim 1, wherein the step of activating is performed by a mouse having a left button and a right button.

3. The method of recognition and translation of claim 1, wherein the step of non-optical character recognition further comprises recognition of the displayed word or phrase through use of a compiled address database.

4. The method of recognition and translation of claim 1, wherein the step of recognizing clipboard applications further comprises:

ascertaining that the display is not a bitmap display;

determining display characteristics by ascertaining whether the System can readily recognize the application through which the display is output; and sending a unique application-specific message to the application to copy the word.

5. The method of recognition and translation of claim 1, further comprising the step of optically recognizing character types output by the digital storage device.

6. The method of recognition and translation of claim 5, wherein the step of optical character recognition comprises recognizing fonts.

7. The method of recognition and translation of claim 6, wherein said step of recognizing fonts comprises the steps of:

iteratively sampling the pixel colors in a confined area of display;

determining whether the confined area of display uses at least one potential foreground color;

determining the background color of the confined area of display by examining an expanding rectangle of pixels in a larger confined area of the display;

creating and indexing a data compilation of background characteristics of various fonts of potential letters;

analyzing the displayed letter and determining the letter best matching the displayed letter using the data compilation of background characteristics of various font of potential letters;

examining the pixels in an expanding confined area of display to analyze and determine each displayed letter in each displayed word; and analyzing each displayed letter in the displayed word and determining the letter best matching each displayed letter using the data compilation of background characteristics of fonts of potential letters.

8. The method of recognition and translation of claim 6, wherein the step of optical character recognition further comprises optically recognizing characters.

9. The method of recognition and translation of claim 8, wherein said step of optically recognizing the character comprises the steps of:

determining the background of the display;

analyzing the characteristics of each displayed letter in a confined area of display;

assessing whether each potential letter is the displayed letter;

analyzing each combination of letters in the confined area of display;

assessing whether each potential word is the displayed combination of letters; and selecting the word matching or most similar to the displayed combination of letters.

10. The method of recognition and translation of claim 9, wherein the step of determining the background of the display comprises the examining an expanding rectangle of the background of the display pixel by pixel.

11. The method of recognition and translation of claim 9, wherein the step of analyzing the characteristics of each displayed letter in the confined area comprises the steps of:

comparing the characteristics of placement and position of background of the displayed letter against characteristics of known potential letters; and comparing the detailed characteristics of each displayed letter of the displayed word against detailed background characteristics of fonts of known potential letters.

12. The method of recognition and translation of claim 11, wherein the step of assessing whether each displayed letter is a potential letter comprises determining the similarity of the displayed letter to each known potential letter.

13. The method of recognition and translation of claim 9, wherein the step of analyzing each combination of letters in the confined area of display comprises the iterative steps of:

determining when an complete independent combination of letters has been analyzed;

determining all permutations of potential letter combinations based upon characteristics of the displayed letter combination;

rejecting any illogical potential letter combination;

determining the detailed characteristics of each displayed letter of the displayed combination of letters against detailed background characteristics of fonts of known potential letters; and determining the probability of each displayed letter to each known potential letter based upon characteristics of the displayed letter.

14. The method of recognition and translation of claim 9, wherein the step of assessing whether each potential word is the displayed combination of letters comprises the iterative steps of:

determining the probability of each potential word to the displayed combination of letters based upon characteristics of each displayed combination of letters; and assessing the likelihood that the displayed letter combination is a potential word.

15. The recognition and translation system of claim 9, wherein the step of selecting the word matching or most similar to the displayed combination of letters comprises ranking the likelihood of each potential word from the list of possible words.

16. The method of recognition and translation of claim 9, wherein the step of translating comprises the following steps:

translating a single word from one written phrase set to a second written phrase set;

determining the existence of any phrases contiguous to the single word; and translating any phrases contiguous to the single word from one written phrase set to a second written phrase set.

17. The method of recognition and translation of claim 1, wherein the step of translating comprises the following steps;

translating a single word form one written phrase set to a second written phrases set;

determining the existence of any phrases contiguous to the single word; and translating any phrases contiguous to the single word form one written phrases set to a second written phrase set.

18. The method of recognition and translation of claim 17, wherein the step of determining the existence of any phrases contiguous to the single displayed word comprises the steps of:

creating a phrase set containing the single displayed word;

alternately recognizing and appending each word to the right and left to the single displayed word to create a new phrase set;

determining the new phrase set in which the displayed single word is used;

determining whether the new phrase set is contained in the translation list from the previous phrase set;

deleting all phrases not matching the new phrase set from the translation list from the previous phrase set;

determining the exact matches or most similar phrases contained in the translation list which are most likely to accurately translate the word; and displaying the translation of the read word.

* * * * *